(12) United States Patent
Mano

(10) Patent No.: US 10,260,440 B2
(45) Date of Patent: Apr. 16, 2019

(54) FUEL INJECTION CONTROL DEVICE AND CONTROL METHOD FOR INTERNAL COMBUSTION ENGINE

(71) Applicant: Nissan Motor Co., Ltd., Yokohama-shi, Kanagawa (JP)

(72) Inventor: Tadaki Mano, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/736,671

(22) PCT Filed: Jun. 19, 2015

(86) PCT No.: PCT/JP2015/067691
§ 371 (c)(1),
(2) Date: Dec. 14, 2017

(87) PCT Pub. No.: WO2016/203634
PCT Pub. Date: Dec. 22, 2016

(65) Prior Publication Data
US 2018/0195449 A1    Jul. 12, 2018

(51) Int. Cl.
*F02D 41/12*    (2006.01)
*F02D 41/34*    (2006.01)
(Continued)

(52) U.S. Cl.
CPC ......... *F02D 41/045* (2013.01); *F02D 15/02* (2013.01); *F02D 41/12* (2013.01); *F02D 41/263* (2013.01); *F02D 41/3094* (2013.01); *F02D 41/34* (2013.01); *F02D 41/40* (2013.01); *F02D 43/00* (2013.01); *F02D 43/04* (2013.01); *F02D 41/0032* (2013.01); *F02D 2250/31* (2013.01); *Y02T 10/44* (2013.01)

(58) Field of Classification Search
CPC ...... F02D 41/045; F02D 41/12; F02D 41/263; F02D 41/34; F02D 15/02; F02D 43/04
USPC ........................................................ 123/493
See application file for complete search history.

(56) References Cited

U.S. PATENT DOCUMENTS 5,092,301 A * 3/1992 Ostdiek ................... F02D 41/18
                                                    123/179.17
5,174,261 A * 12/1992 Fujii ...................... F02D 35/023
                                                    123/435
(Continued)

FOREIGN PATENT DOCUMENTS

EP    2757237 A1    7/2014
EP    3184788 A1    6/2017
(Continued)

*Primary Examiner* — Mahmoud Gimie
(74) *Attorney, Agent, or Firm* — Young Basile Hanlon & MacFarlane, P.C.

(57) ABSTRACT

An internal combustion engine comprises a port injection injector for injecting fuel into an intake port and a direct injection injector for injecting fuel into a combustion chamber. A controller causes the port injection injector and the direct injection injector to inject fuel on the basis of a running condition of the internal combustion engine. Further, the controller increases an injection amount of the direct injection injector above a normal injection amount of the direct injection injector when the internal combustion engine decelerates, thereby reducing the fuel pressure of the direct injection injector rapidly.

11 Claims, 6 Drawing Sheets

(51) Int. Cl.
*F02D 41/04* (2006.01)
*F02D 43/00* (2006.01)
*F02D 15/02* (2006.01)
*F02D 41/30* (2006.01)
*F02D 41/40* (2006.01)
*F02D 41/26* (2006.01)
*F02D 43/04* (2006.01)
*F02D 41/00* (2006.01)

(56) References Cited

U.S. PATENT DOCUMENTS

| | | | |
|---|---|---|---|
| 5,579,736 A * | 12/1996 | Nakamura | F02D 37/02 |
| | | | 123/339.11 |
| 5,967,113 A * | 10/1999 | Kaneko | F02B 17/005 |
| | | | 123/295 |
| 2005/0274359 A1 | 12/2005 | Miyashita | |
| 2013/0035842 A1* | 2/2013 | Sasaki | F02D 41/1455 |
| | | | 701/109 |
| 2014/0366845 A1 | 12/2014 | Kramer et al. | |

FOREIGN PATENT DOCUMENTS

| | | | |
|---|---|---|---|
| JP | 63071535 A * | 3/1988 | |
| JP | 2004156578 A | 6/2004 | |
| JP | 2006336620 A | 12/2006 | |
| JP | 2007162611 A | 6/2007 | |
| JP | 2007170190 A | 7/2007 | |
| JP | 2007239487 A | 9/2007 | |
| JP | 201336447 A | 2/2013 | |
| JP | 2014240627 A | 12/2014 | |
| WO | WO-2010139880 A2 * | 12/2010 | F02D 41/0072 |

* cited by examiner

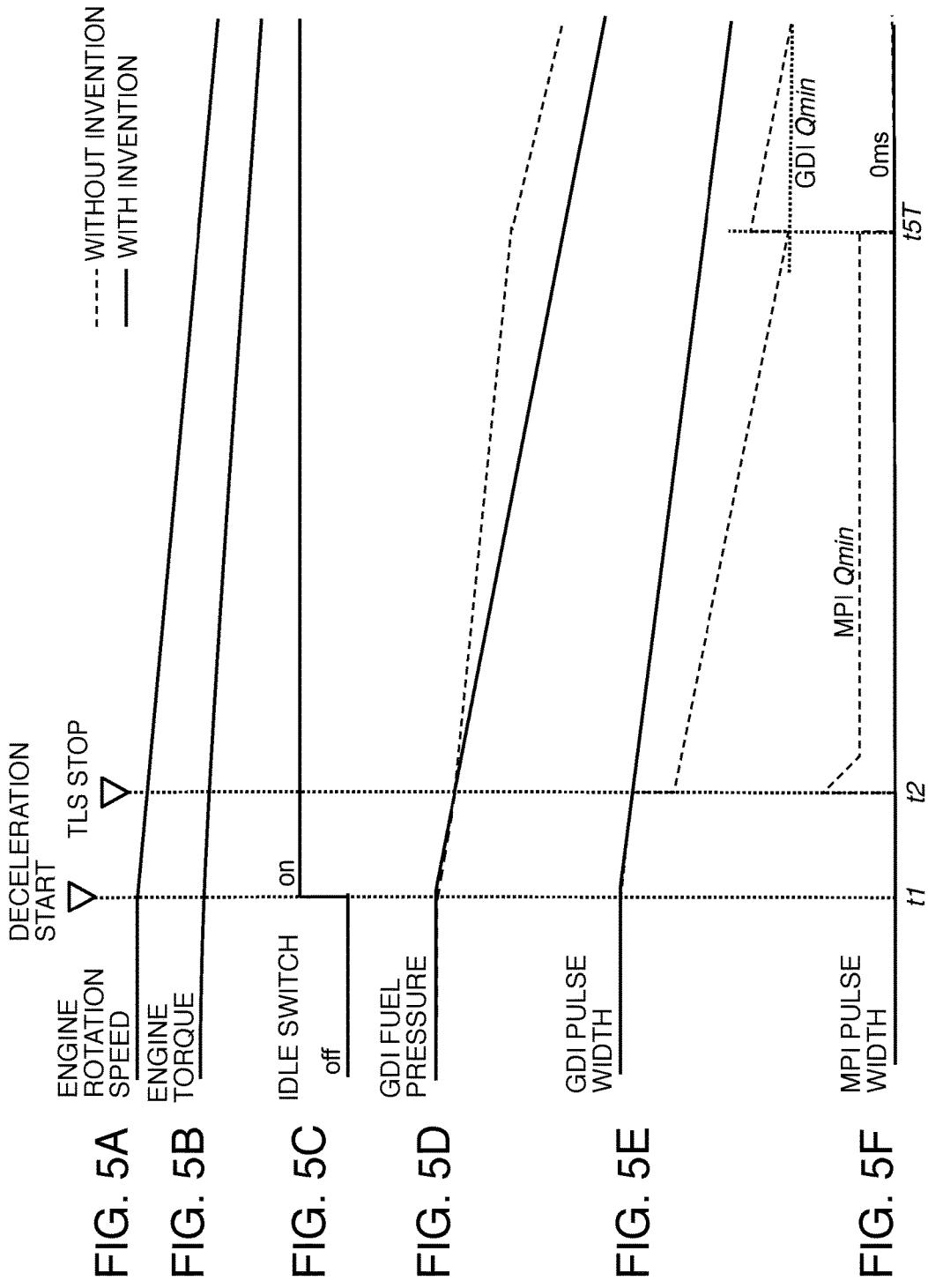

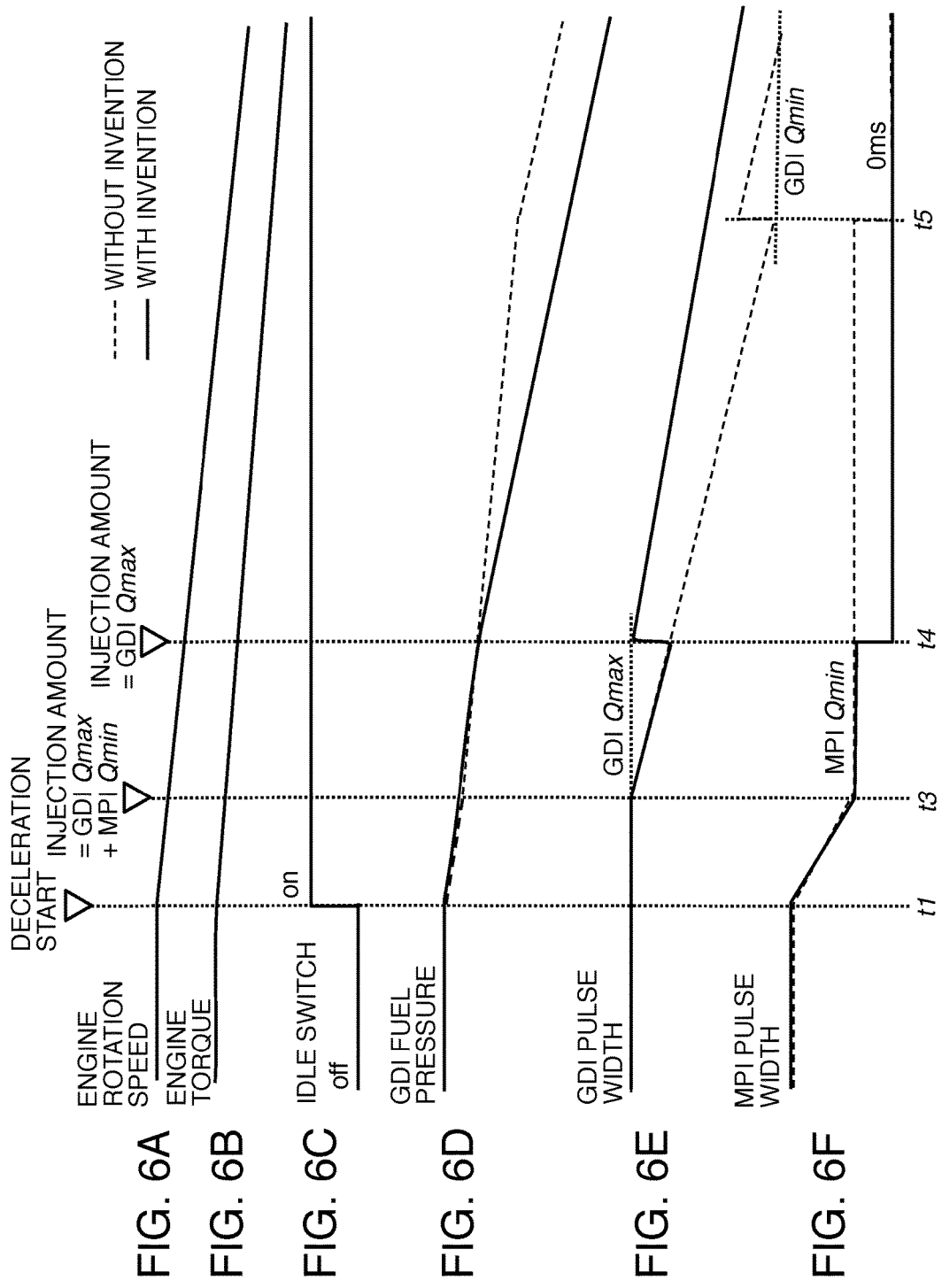

FUEL INJECTION CONTROL DEVICE AND CONTROL METHOD FOR INTERNAL COMBUSTION ENGINE

TECHNICAL FIELD

The present invention relates to fuel injection control performed when an internal combustion engine decelerates. The internal combustion engine has a direct injection injector that injects fuel directly into a combustion chamber and a port injection injector that injects fuel into an intake port.

BACKGROUND

There are several methods for injecting fuel into an internal combustion engine. One of these methods is gasoline direct injection (GDI), in which a direct injection injector injects fuel directly into a combustion chamber. Another method is multi-point injection (MPI), in which a port injection injector provided in each intake port of a multi-cylinder engine injects fuel toward intake air in the intake port.

JP2013-036447A, published by the Japan Patent Office in 2013, proposes fuel injection control for an internal combustion engine of a vehicle that comprises both a direct injection injector and a port injection injector. Specifically, in a low load operation region (a first execution range) of the internal combustion engine, fuel injection is executed using the port injection injector alone, and in an operation region (a second execution range) on a high load side of the first execution range, fuel injection is executed using the direct injection injector. More specifically, within the second execution range, in a low load region in which the engine load is comparatively low, fuel is injected from both the port injection injector and the direct injection injector, and in a high load region in which the engine load is high, fuel is injected from the direct injection injector alone.

According to this prior art, when the internal combustion engine decelerates from the second execution range, fuel is injected from both the direct injection injector and the port injection injector until the engine load reaches the first execution range. A fuel pressure of the direct injection injector typically increases as the engine load increases, and therefore, if fuel is injected from the port injection injector as well as from the direct injection injector when the internal combustion engine decelerates, the fuel pressure of the direct injection injector remains high.

When the internal combustion engine switches to acceleration while the fuel pressure is high, it is difficult to control the fuel injection amount to a small amount using the direct injection injector. In a case where the control of the prior art is employed, therefore, the amount of fuel injected when fuel injection by the direct injection injector is resumed inevitably increases as the engine load increases.

SUMMARY

It is therefore an object of the present invention is to reduce the fuel pressure of a direct injection injector rapidly in a decelerating state.

In order to achieve the above object, the present invention provides a fuel injection control device for an internal combustion engine having a port injection injector for injecting fuel into an intake port and a direct injection injector for injecting fuel into a combustion chamber under a fuel pressure that increases according to an increase in an engine load. The fuel injection control device comprises a sensor that detects a running condition of the internal combustion engine and a programmable controller. The controller is programmed to cause the port injection injector and the direct injection injector to inject fuel on the basis of the running condition. The controller is further programmed to increase an injection amount that the direct injection injector injects when the internal combustion engine decelerates, above a normal injection amount of the direct injection injector.

The details as well as other features and advantages of this invention are set forth in the remainder of the specification and are shown in the accompanying drawings.

BRIEF DESCRIPTION OF THE DRAWINGS

FIGS. 5A-5F are timing charts illustrating execution results obtained when the engine controller executes the deceleration state fuel injection control routine; and FIGS. 6A-6F are timing charts illustrating different execution results obtained when the engine controller executes the deceleration state fuel injection control routine.

DETAILED DESCRIPTION OF THE EMBODIMENTS

Figure 1:
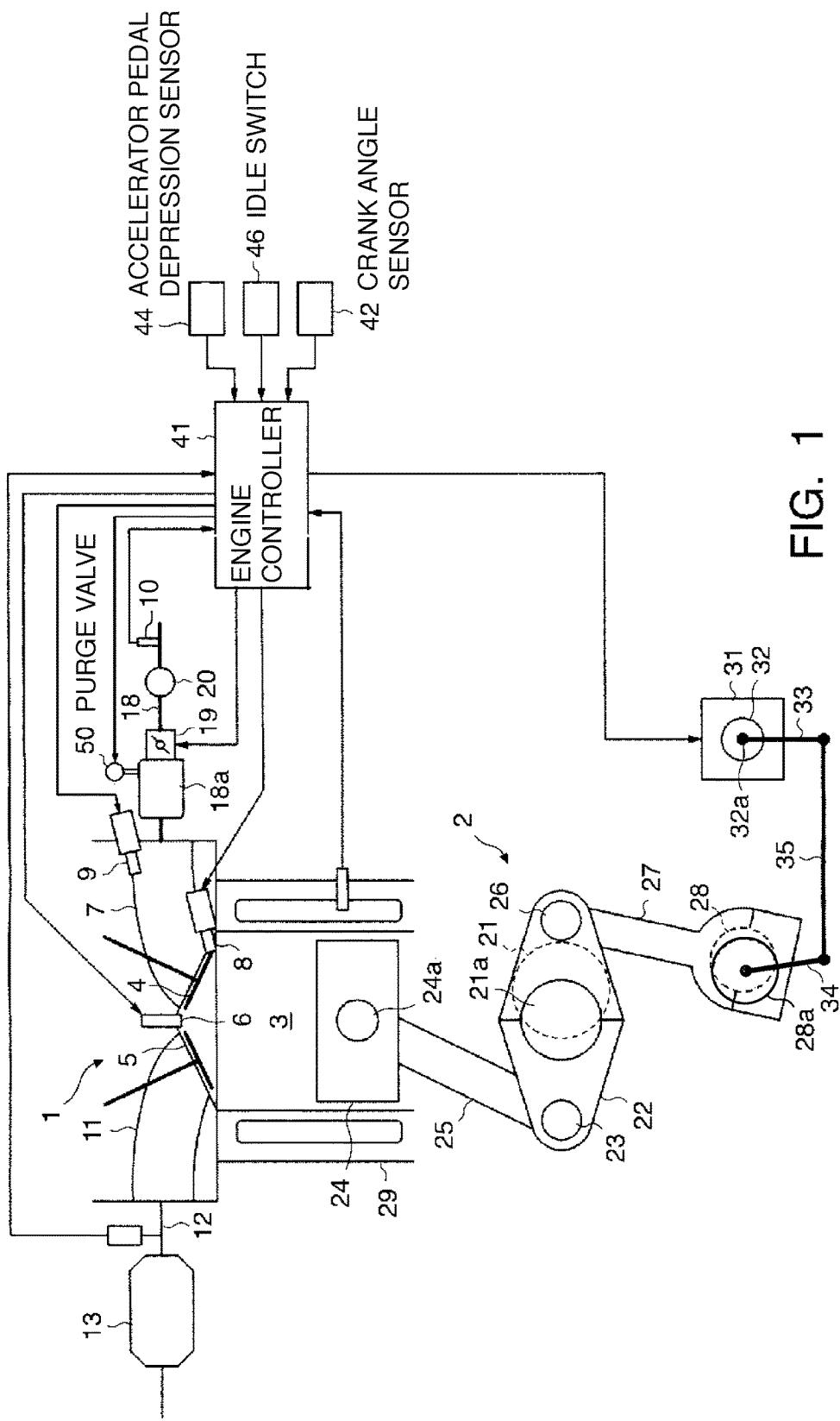
FIG. 1 is a schematic diagram showing a fuel injection control device according to an embodiment of the present invention.

Referring to FIG. 1 of the drawings, an internal combustion engine 1 for an automobile is constituted by a four-stroke cycle, turbocharged multi-cylinder spark ignition internal combustion engine that comprises a variable compression ratio mechanism 2 employing a multi-link piston-crank mechanism.

The internal combustion engine 1 comprises an intake valve 4, an exhaust valve 5, a direct injection injector 8, and an ignition plug 6, all of which oppose a combustion chamber 3. The intake valve 4 is configured such that opening/closing timings thereof can be varied by a variable mechanism, not shown in the figures.

The direct injection injector 8 is provided opposite each combustion chamber 3 as a main fuel injector, and injects fuel directly into the combustion chamber 3.

An intake port 7 and an exhaust port 11 are connected to each combustion chamber 3 via the intake valve 4 and the exhaust valve 5, respectively. A port injection injector 9 is provided in the intake port 7 as an auxiliary fuel injector.

The direct injection injector 8 and the port injection injector 9 are constituted by electromagnetic or piezoelectric injectors that open in response to a pulse-width modulation signal output by an engine controller 41, and inject an amount of fuel that is commensurate with a pulse width of the pulse-width modulation signal.

An intake collector 18a and an intake passage 18 are connected to the intake port 7 via an intake manifold. An electronically controlled throttle 19, an opening of which is controlled by a control signal from the engine controller 41, is provided in the intake passage 18 upstream of the intake collector 18a. A compressor 20 of a turbocharger is provided in the intake passage 18 upstream of the throttle 19. Further, an air-flow meter 10 for detecting an intake air amount is disposed in the intake passage 18 upstream of the compressor 20.

A purge valve 50 for merging fuel vapor in a fuel tank with the intake air is connected to the intake collector 18a.

An exhaust passage 12 is connected to the exhaust port 11 via an exhaust manifold and an exhaust collector. A catalytic converter 13 constituted by a three-way catalyst, and a turbine, not shown in the figure, are interposed in the exhaust passage 12.

The engine controller 41 is constituted by a microcomputer having a central processing unit (CPU), a read-only memory (ROM), a random access memory (RAM), and an input/output interface (I/O interface). The controller may be constituted by a plurality of microcomputers.

Various sensors, including a crank angle sensor 42 that detects an engine rotation speed, an accelerator pedal depression sensor 44 that detects a depression amount of an accelerator pedal operated by a driver of the vehicle, and an idle switch 46 that detects an idle operation of the internal combustion engine 1 are respectively connected to the engine controller 41 by signal circuits. On the basis of these detection signals, the engine controller 41 controls respective fuel injection amounts and injection timings of the direct injection injector 8 and the port injection injector 9. The engine controller 41 also controls an ignition timing of the ignition plug 6, the opening of the throttle 19, a compression ratio of the internal combustion engine 1, which is controlled via the variable compression ratio mechanism 2, and opening/closing of the purge valve 50.

The variable compression ratio mechanism 2 is constituted by a conventional multi-link piston-crank mechanism. More specifically, the variable compression ratio mechanism 2 comprises a lower link 22, an upper link 25, and a control link 27. The lower link 22 is supported by a crank pin 21a of a crank shaft 21 to be free to rotate. The upper link 25 is coupled to an upper pin 23, which is engaged to one end of the lower link 22, and a piston pin 24a of a piston 24. The control link 27 is coupled at one end to a control pin 26 that is engaged to the other end of the lower link 22, and supported by a control shaft 28 to be free to swing at the other end. The crank shaft 21 and the control shaft 28 are supported to be free to rotate via a bearing structure inside a crank case provided below a cylinder block 29. The control shaft 28 has an eccentric axis 28a. An end portion of the control link 27 is fitted rotatably to the eccentric axis 28a. In the variable compression ratio mechanism 2, a top dead center position of the piston 24 is vertically displaced as the control shaft 28 rotates, and as a result, the compression ratio of the internal combustion engine 1 is varied.

A drive motor 31 having a parallel rotary axis to the crank shaft 21 is disposed below the cylinder block 29 in order to drive the variable compression ratio mechanism 2. A reduction gear 32 is connected to the drive motor 31. An output shaft 32a of the reduction gear 32 is disposed coaxially with an output shaft of the drive motor 31. The output shaft 32a of the reduction gear 32 and the control shaft 28 are parallel to each other. A first arm 33 fixed to the output shaft 32a and a second arm 34 fixed to the control shaft 28 are coupled by an intermediate link 35 so that the output shaft 32a and the control shaft 28 rotate in conjunction with each other.

Rotation of the drive motor 31 is reduced in speed by the reduction gear 32, and then output to the reduction gear output shaft 32a. Rotary displacement of the reduction gear output shaft 32a is transmitted from the first arm 33 to the second arm 34 via the intermediate link 35 so as to rotationally displace the control shaft 28. As a result, the compression ratio of the internal combustion engine 1 varies.

A target compression ratio of the variable compression ratio mechanism 2 is set in the engine controller 41 on the basis of engine running conditions represented by the engine load and the engine rotation speed. The engine controller 41 controls driving of the drive motor 31 so as to realize the target compression ratio.

In this internal combustion engine 1, gasoline direct injection (GDI) and multi-point injection (MPI) are executed by the direct injection injector 8 and the port injection injector 9, respectively. During both gasoline direct injection (GDI) and multi-point injection (MPI), fuel is injected into each cylinder.

Figure 4:
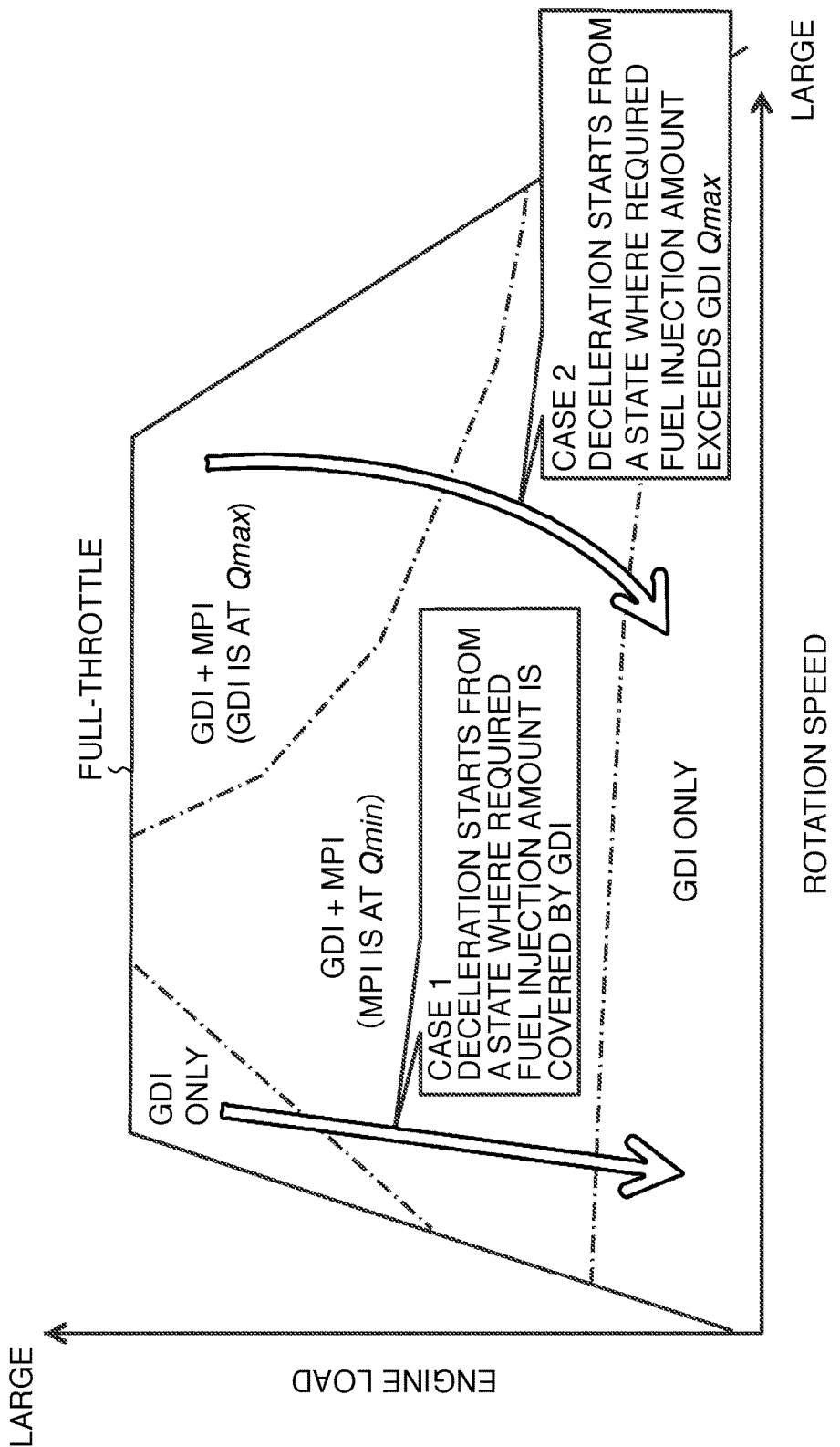
FIG. 4 is a diagram showing the content of a map stored by the engine controller relating to use of gasoline direct injection (GDI) and multi-point injection (MPI)

FIG. 4 shows regions in which GDI and MPI are applied during normal running, these regions being set in accordance with the engine rotation speed and the engine load and divided in accordance with the specifications of the internal combustion engine 1. Referring to FIG. 4, in a low load region and a high load and low rotation speed region of the engine, only GDI is applied, while everywhere else, GDI and MPI are both employed.

In the low load region of the engine, the required fuel injection amount is small, and therefore, when GDI and MPI are both employed, either the direct injection injector 8 or the port injection injector 9 falls below a minimum value Qmin of the injection amount. Hence, only GDI is applied. It should be noted that in the following description, a maximum value of the injection amount will be indicated by Qmax and the minimum value of the injection amount will be indicated by Qmin in relation to both the direct injection injector 8 and the port injection injector 9.

In the high load and low rotation speed region of the engine, a turbo response is improved by increasing the rotation speed of the turbine using a so-called scavenging effect, in which respective valve-opening periods of the intake valve and the exhaust valve are overlapped so that fresh air flowing in through the intake port 7 flows out into the exhaust port 11 as is in the form of scavenging gas. However, when MPI by the port injection injector 9 is introduced at this time, the fuel injected through the port injection injector 9 may be discharged from the exhaust valve 5, and therefore only GDI is applied.

In the regions where GDI and MPI are both employed, the minimum value Qmin of the injection amount that can be injected by the port injection injector 9 is injected by MPI, and the shortfall is injected through the direct injection injector 8. The reason for injecting the minimum value Qmin of the injection amount through the port injection injector 9 is to prevent a blockage in the port injection injector 9.

In a high load and high rotation speed region, where an injection amount that exceeds the maximum value Qmax of the injection amount that can be injected by the direct injection injector 8 is required, the maximum value Qmax of the injection amount that can be injected by the direct injection injector 8 is injected by GDI, and the shortfall is injected through the port injection injector 9.

Hence, during normal running, GDI and MPI allocations are determined, whereupon both the direct injection injector 8 and the port injection injector 9 are opened for periods corresponding to the pulse width of the injection pulse-width modulation signal output by the engine controller 41 so that fuel is injected in an amount commensurate with the pulse width. Fuel is supplied to the direct injection injector 8 from a common rail.

A fuel pressure of the common rail typically increases as the load increases, or in other words as the fuel injection amount increases. In the prior art, in a state of deceleration from a high load, fuel is injected from both the direct injection injector and the port injection injector.

As a result, the fuel pressure of the direct injection injector is apt to be maintained at a high pressure even after the internal combustion engine decelerates. Therefore, when fuel injection by the direct injection injector is resumed, favorable control precision may not be obtained with respect to injection of a small amount of fuel. To ensure that the injection amount is controlled precisely, fuel injection by the direct injection injector cannot be resumed until the required fuel injection amount increases.

In other words, by ensuring that the fuel pressure exerted on the direct injection injector 8 can be reduced early when the internal combustion engine 1 decelerates, fuel injection by the direct injection injector 8 can be resumed early on the basis of favorable control precision when the vehicle re-accelerates.

Figure 2:
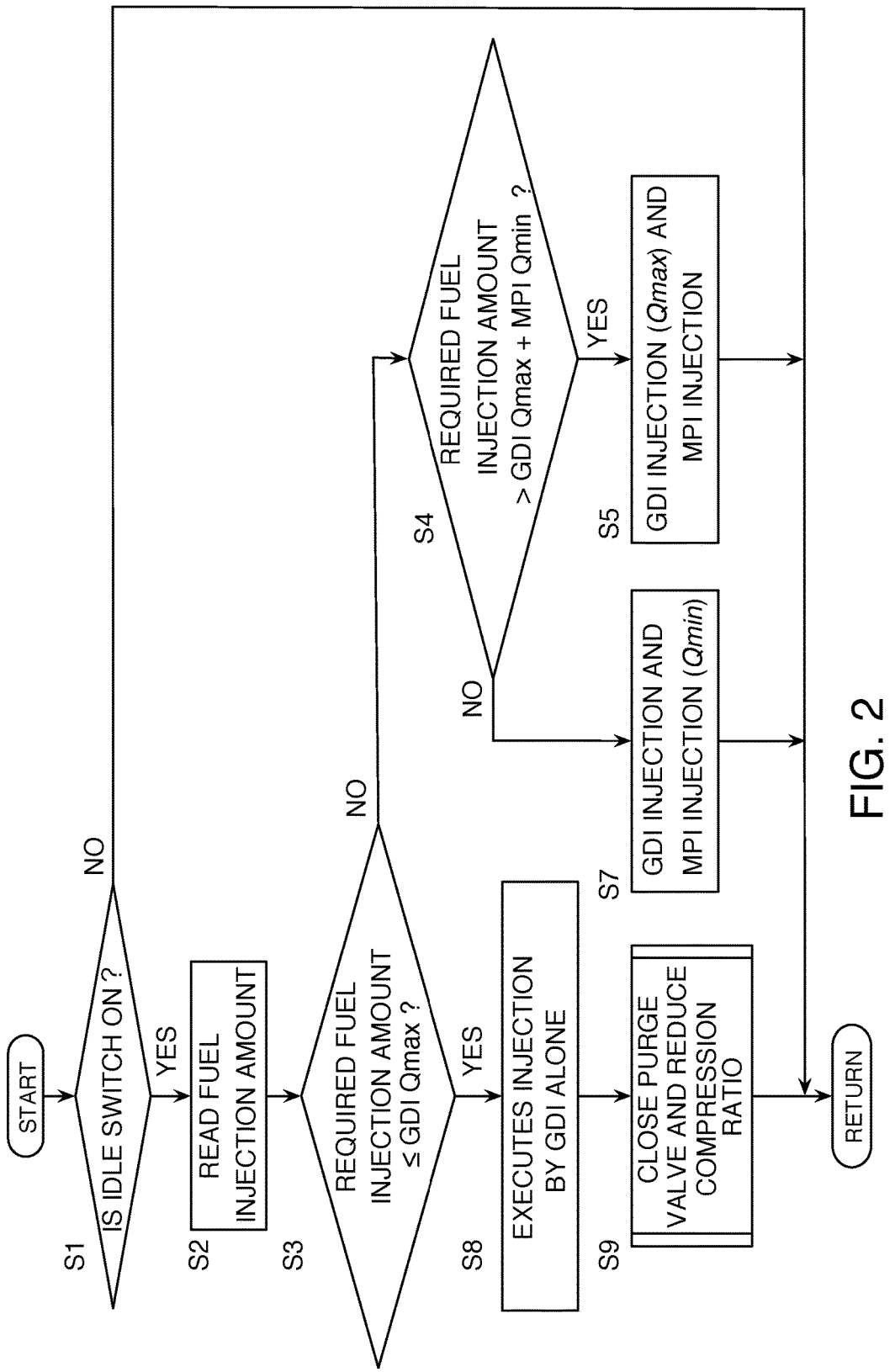
FIG. 2 is a flowchart illustrating a deceleration state fuel injection control routine executed on an internal combustion engine by an engine controller, according to the embodiment of the present invention.

To reduce the fuel pressure exerted on the direct injection injector 8 when the internal combustion engine 1 decelerates, the engine controller 41 executes a deceleration state fuel injection control routine shown in FIG. 2. This routine is executed repeatedly at intervals of a fixed period of ten milliseconds, for example. It should be noted that the respective fuel injection amounts of the direct injection injector 8 and the port injection injector 9 are controlled by injection pulse-width modulation signals output individually to the injectors from the engine controller 41.

The required fuel injection amount itself is not calculated in the deceleration state fuel injection control routine. The fuel injection amount required by the internal combustion engine 1 is assumed to be calculated in a separate routine on the basis of the running conditions of the internal combustion engine 1. The deceleration state fuel injection control routine is executed after calculating the required fuel injection amount in order to determine how to allocate the calculated required fuel injection amount to GDI and MPI.

Referring to FIG. 2, in a step S1, the engine controller 41 determines whether or not the internal combustion engine 1 is decelerating. More specifically, the engine controller 41 determines whether or not an input signal from the idle switch 46 is ON. When the idle switch 46 is ON, this means that the accelerator pedal of the vehicle is not depressed and the internal combustion engine 1 is decelerating. When the idle switch 46 is ON, the engine controller 41 executes processing from step S2 onward. When the idle switch 46 is not ON, the internal combustion engine 1 is not decelerating, and therefore the engine controller 41 immediately terminates the routine.

Next, in a step S2, the engine controller 41 reads the fuel injection amount calculated in the separate routine.

In a step S3, the engine controller 41 determines whether or not the required fuel injection amount is equal to or smaller than the maximum value Qmax of the GDI injection amount. It should be noted that the injection amount of the direct injection injector 8 is synonymous with the GDI injection amount. Further, the injection amount of the port injection injector 9 is synonymous with the MPI injection amount.

When it is determined that the required fuel injection amount is equal to or smaller than the maximum value Qmax of the GDI injection amount, the engine controller 41 executes injection by GDI alone in a step S8. More specifically, an injection pulse-width modulation signal corresponding to the injection amount is output from the engine controller 41 to the direct injection injector 8. The engine controller 41 does not, however, output an injection pulse-width modulation signal to the port injection injector 9.

Next, in a step S9, the engine controller 41 executes a purge valve closing and compression ratio reducing sub-routine, and then terminates the routine.

In the present invention, whether or not to execute the purge valve closing and compression ratio reducing sub-routine is a matter that may be selected optionally, and the sub-routine is not essential. The sub-routine will be described later.

When the determination of the step S3 is negative, the engine controller 41 determines in a step S4 whether or not the required fuel injection amount exceeds a sum of the maximum value Qmax of the GDI injection amount and the minimum value Qmin of the MPI injection amount.

When the required injection amount exceeds the sum of the maximum value Qmax of the GDI injection amount and the minimum value Qmin of the MPI injection amount, the engine controller 41, in a step S5, executes GDI at the maximum value Qmax of the injection amount, and compensates for the shortfall in the required injection amount by MPI injection. More specifically, the engine controller 41 outputs an injection pulse-width modulation signal corresponding to the maximum value Qmax of the GDI injection amount to the direct injection injector 8, and outputs an injection pulse-width modulation signal corresponding to the shortfall to the port injection injector 9. Following the processing of the step S5, the engine controller 41 terminates the routine.

When the determination of the step S4 is negative, or in other words when the required injection amount is equal to or smaller than the sum of the maximum value Qmax of the GDI injection amount and the minimum value Qmin of the MPI injection amount, the port injection injector 9 is caused to inject the minimum value Qmin of the injection amount in a step S7. Further, the direct injection injector 8 is caused to inject a difference between the required injection amount and the minimum value Qmin of the injection amount of the port injection injector 9. Following the processing of the step S7, the engine controller 41 terminates the routine.

According to the deceleration state fuel injection control routine, when the required injection amount is equal to or smaller than Qmax of GDI, injection by the port injection injector 9 is stopped, and injection is executed by GDI alone in step S8. In so doing, priority is given to reducing the fuel pressure of the direct injection injector 8.

Next, referring to FIG. 3, the purge value closing and compression ratio reducing sub-routine will be described.

In a step S21, the engine controller 41 determines whether or not the required fuel injection amount is smaller than the minimum value Qmin of the GDI injection amount.

When the required fuel injection amount is smaller than the minimum value Qmin of the GDI injection amount, the engine controller 41 increases the required fuel injection amount by performing the processing of steps S22 and S23.

In the step S22, the purge valve 50 is closed. The purge valve 50 constitutes a fuel vapor purging system for merging the fuel vapor in the fuel tank with the intake air. When a part of the amount of fuel required by the internal combustion engine 1 is provided by a fuel supply amount from the purge valve 50, the required fuel injection amount decreases correspondingly. Hence, by closing the purge valve 50, the operation of the fuel vapor purging system is stopped, and as a result, the required fuel injection amount increases.

In the step S23, the compression ratio of the internal combustion engine 1 is reduced via the variable compression ratio mechanism 2. A reduction in the compression ratio leads to a reduction in thermal efficiency, and as a result, the required fuel injection amount increases.

Hence, the required fuel injection amount is increased by the processing of both the step S22 and the step S23. Accordingly, opportunities for GDI injection by the direct injection injector 8 increase, and as a result, the fuel pressure exerted on the direct injection injector 8 can be reduced.

Figure 3:
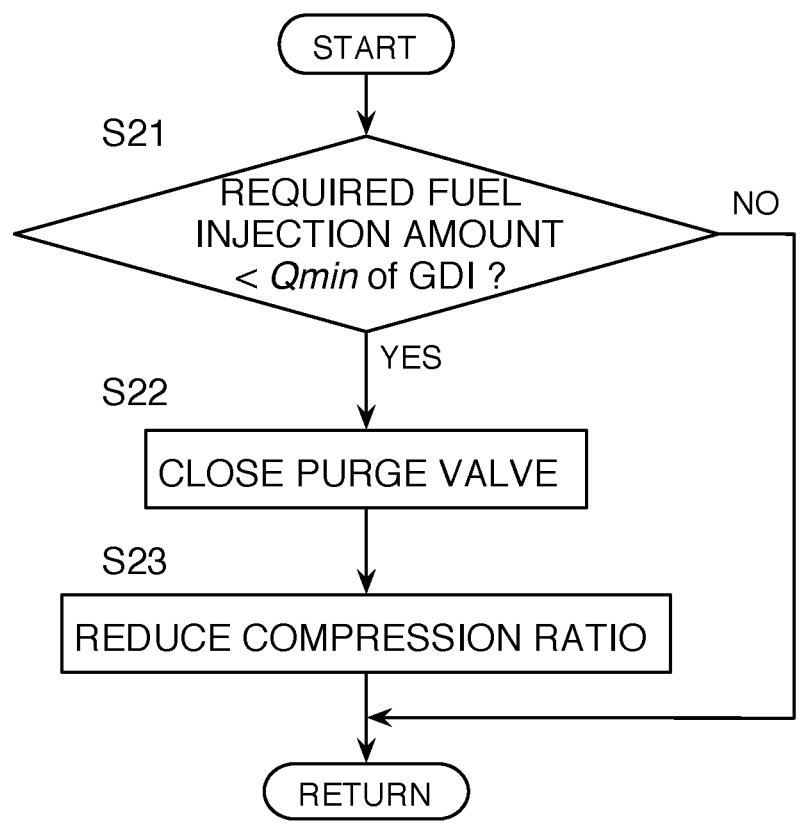
FIG. 3 is a flowchart illustrating a purge valve closing and compression ratio reducing sub-routine, which is executed during the deceleration state fuel injection control routine.

It should be noted that in the sub-routine shown in FIG. 3, the steps S22 and S23 are both executed, but a proportionate effect is obtained in relation to increasing opportunities for GDI injection by the direct injection injector 8 even when the sub-routine is configured such that the processing of only one of these steps is executed.

Referring to FIGS. 5A-5F, execution results of the deceleration state fuel injection control routine will be described. FIGS. 5A-5F correspond to Case 1 in FIG. 4.

As shown in FIG. 5C, at a time t1, the idle switch switches from OFF to ON, whereby the deceleration state fuel injection control routine is substantially activated. This timing corresponds to the start of deceleration in the figure. In Case 1, the fuel injection amount required at the deceleration start point is equal to or smaller than the maximum value Qmax of GDI by the direct injection injector 8, and therefore the entire required fuel injection amount is injected by GDI using the direct injection injector 8.

In the deceleration state fuel injection control routine shown in FIG. 2, therefore, the determination of the step S3 is affirmative, and accordingly, the engine controller 41 executes the processing of the steps S8 and S9 repeatedly. As a result, as shown in FIG. 5E, the pulse width of the injection pulse-width modulation signal output to the direct injection injector 8 from the engine controller 41 decreases, leading to corresponding reductions in engine torque, as shown in FIG. 5B, and the engine rotation speed, as shown in FIG. 5A. By executing GDI continuously using the direct injection injector 8 in this manner, a corresponding reduction in the fuel pressure of the direct injection injector 8 is obtained, as shown in FIG. 5D.

In the deceleration pattern of Case 1, as shown on the map in FIG. 4, a region in which GDI and MPI are both employed occurs midway during deceleration. According to the deceleration state fuel injection control routine, the engine controller 41 executes the steps S8 and S9 repeatedly even in this case, such that only GDI using the direct injection injector 8 is executed. As a result, the fuel pressure of the direct injection injector 8 can be reduced rapidly.

Dotted lines in FIGS. 5D-5F denote a deceleration state fuel injection pattern obtained when the deceleration state fuel injection control routine is not executed.

In this case also, GDI injection by the direct injection injector 8 is executed alone for a while after the idle switch switches ON. At a time t2, however, when the engine rotation speed and the engine load enter a GDI+MPI region on the map in FIG. 4, GDI by the direct injection injector 8 and MPI by the port injection injector 9 are both employed. Even after the MPI injection amount injected by the port injection injector 9 decreases to the minimum value Qmin, as shown in FIG. 5F, the port injection injector 9 continues to inject fuel at the minimum value Qmin of the injection amount, while the remainder of the required fuel injection amount is injected by GDI using the direct injection injector 8. As shown in FIG. 5E, therefore, the fuel injection pulse width output to the direct injection injector 8 shortens by an amount corresponding to the minimum value Qmin of MPI by the port injection injector 9. As a result, as shown in FIG. 5D, the fuel pressure of the direct injection injector 8 decreases more slowly.

In the deceleration state fuel injection pattern obtained when the deceleration state fuel injection control routine is not executed, when the engine rotation speed and the engine load enter the region of GDI alone on the map in FIG. 4, MPI by the port injection injector 9 is stopped such that again, only GDI by the direct injection injector 8 is executed. As shown in FIGS. 5E and 5F, this region corresponds to a case in which the GDI injection amount injected by the direct injection injector 8 falls below the minimum value Qmin at a time t5. In this region, MPI by the port injection injector 9 is stopped such that only GDI by the direct injection injector 8 is executed.

Hence, in an internal combustion engine in which fuel injection is executed in accordance with the map shown in FIG. 4, by executing the deceleration state fuel injection control routine according to this embodiment in Case 1, the fuel pressure of the direct injection injector 8 can be reduced rapidly.

FIG. 5A indicates that TLS is stopped at the time t2, TLS being an abbreviation for Total Lean Scavenging. This refers to valve timing control for increasing the rotation speed of the turbine using the so-called scavenging effect, in which the respective valve-opening periods of the intake valve and the exhaust valve are overlapped so that fresh air flowing in through the intake port 7 flows out into the exhaust port 11 as is in the form of scavenging gas. When MPI by the port injection injector 9 is introduced during this valve timing control, the fuel injected by MPI may be discharged from the exhaust valve in relation to the injection timing, and therefore only GDI injection is performed. At the time t2, TLS is stopped, and the valve timings are returned to normal.

Referring to FIGS. 6A-6F, different execution results of the deceleration state fuel injection control routine will be described. FIGS. 6A-6F correspond to Case 2 in FIG. 4.

As shown in FIG. 6C, at the time t1, the idle switch switches from OFF to ON, whereby the deceleration state fuel injection control routine is substantially activated. This timing corresponds to the start of deceleration in the figure. In Case 2, the fuel injection amount required at the deceleration start point exceeds the maximum value Qmax of GDI by the direct injection injector 8, and therefore the determination of the step S3 in FIG. 2 is negative. When the determination of the step S4 in FIG. 2 becomes affirmative, the engine controller 41, in the step S5, distributes the required fuel injection amount such that the direct injection injector 8 injects the maximum value Qmax of the GDI injection amount, as shown in FIG. 6E, and the port injection injector 9 injects the remaining fuel, as shown in FIG. 6F. In so doing, GDI injection can be maximized while satisfying the required injection amount, and as a result, the fuel pressure of the direct injection injector 8 can be reduced efficiently.

When the required injection amount becomes equal to the sum of the maximum value Qmax of the GDI injection amount and the minimum value Qmin of the MPI injection amount, the determination of the step S4 switches to negative. This corresponds to a time t3 in FIG. 6A. In step S7, the engine controller 41 executes MPI at the minimum value Qmin, as shown in FIG. 6F. Further, as shown in FIG. 6E, the remainder of the required fuel amount is injected by GDI.

When the determination of the step S3 switches to affirmative at a time t4, the engine controller 41 executes the processing of the steps S8 and S9 repeatedly thereafter. Accordingly, as shown in FIG. 6F, MPI injection is stopped, and the entire required injection amount is injected by GDI until the fuel injection amount reaches zero. As a result, as shown in FIG. 6D, the fuel pressure of the direct injection injector 8 can be reduced rapidly. In the deceleration pattern of Case 2, a region in which GDI and MPI are both employed (such that the minimum value Qmin is injected by MPI and the shortfall by GDI) occurs midway during deceleration, but according to the deceleration state fuel injection control routine, the engine controller 41 executes the steps S8 and S9 repeatedly even in this case such that only GDI using the direct injection injector 8 is executed. As a result, the fuel pressure of the direct injection injector 8 can be reduced rapidly.

Dotted lines in FIGS. 6D-6F denote deceleration state fuel injection control results obtained when the deceleration state fuel injection control routine is not executed. In this case, up to the time t4, fuel injection is performed in an identical pattern to that of a case in which the deceleration state fuel injection control routine is executed. From the time t4 onward, substantially identical control to that of Case 1 is executed. More specifically, from the time t4 onward, the engine rotation speed and the engine load are in the GDI+MPI region on the map in FIG. 4, and therefore GDI by the direct injection injector 8 and MPI by the port injection injector 9 are both employed such that the port injection injector 9 continues to inject fuel at the minimum value Qmin of the injection amount, while the remainder of the required fuel injection amount is injected by GDI using the direct injection injector 8. As shown in FIG. 6E, therefore, the fuel injection pulse width output to the direct injection injector 8 shortens by an amount corresponding to the minimum value Qmin of MPI by the port injection injector 9. As a result, as shown in FIG. 6D, the fuel pressure of the direct injection injector 8 decreases more slowly.

As described above, likewise in Case 2, by executing the deceleration state fuel injection control routine according to this embodiment, the fuel pressure of the direct injection injector 8 can be reduced rapidly.

The present invention was described above using a specific embodiment, but the present invention is not limited to the above embodiment, and a person skilled in the art will be able to apply various amendments and modifications to the embodiment within the technical scope of the claims.

For example, in the above embodiment, the present invention is applied to the internal combustion engine 1, in which the main injection is performed by the direct injection injector 8 and the auxiliary injection is performed by the port injection injector 9. However, the present invention may also be applied to an internal combustion engine in which the main injection is performed by the port injection injector and the auxiliary injection is performed by the direct injection injector.

The embodiments of this invention in which an exclusive property or privilege is claimed are defined as follows:

1. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:
   a sensor that detects a running condition of the internal combustion engine; and
   a programmable controller programmed to:
   cause the port injection injector and the direct injection injector to inject fuel on the basis of the running condition; and
   increase an injection amount that the direct injection injector injects when the internal combustion engine decelerates, wherein the injection amount is increased to above an injection amount of the direct injection injector that occurs during running of the internal combustion engine outside of deceleration.

2. The fuel injection control device as defined in claim 1, wherein the controller is further programmed to cause the port injection injector to decrease a fuel injection amount or stop fuel injection when increasing the injection amount that the direct injection injector injects.

3. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:
   a sensor that detects a running condition of the internal combustion engine; and
   a programmable controller programmed to:
   cause the port injection injector and the direct injection injector to inject fuel on the basis of the running condition; and
   increase an injection amount that the direct injection injector injects when the internal combustion engine decelerates, wherein the injection amount is increased to above an injection amount of the direct injection injector that occurs during running of the internal combustion engine outside of deceleration, wherein the controller is further programmed to stop injection by the port injection injector such that fuel is injected by the direct injection injector alone when the internal combustion engine decelerates.

4. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:
   a sensor that detects a running condition of the internal combustion engine; and
   a programmable controller programmed to:
   cause the port injection injector and the direct injection injector to inject fuel on the basis of the running condition; and
   increase an injection amount that the direct injection injector injects when the internal combustion engine decelerates, wherein the injection amount is increased to above an injection amount of the direct injection injector that occurs during running of the internal combustion engine outside of deceleration, wherein the controller is further programmed to increase the injection amount of the direct injection injector in a case where an injection amount required when the internal combustion engine decelerates is equal to or smaller than a maximum injection amount of the direct injection injector.

5. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:

a sensor that detects a running condition of the internal combustion engine; and a programmable controller programmed to:

cause the port injection injector and the direct injection injector to inject fuel on the basis of the running condition; and increase an injection amount that the direct injection injector injects when the internal combustion engine decelerates, wherein the injection amount is increased to above an injection amount of the direct injection injector that occurs during running of the internal combustion engine outside of deceleration, wherein the controller is further programmed to set the injection amount of the direct injection injector at a maximum injection amount of the direct injection injector and set a remainder of a required injection amount as an injection amount of the port injection injector in a case where an injection amount required when the internal combustion engine decelerates exceeds a maximum injection amount of the direct injection injector.

6. The fuel injection control device as defined in claim 5, wherein the controller is further programmed to set the injection amount of the port injection injector at a minimum injection amount of the port injection injector and set the remainder of the required injection amount as the injection amount of the direct injection injector in a case where the injection amount required when the internal combustion engine decelerates is equal to or smaller than a sum of the minimum injection amount of the port injection injector and the maximum injection amount of the direct injection injector.

7. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:

a sensor that detects a running condition of the internal combustion engine; and a programmable controller programmed to:

cause the port injection injector and the direct injection injector to inject fuel on the basis of the running condition; and increase an injection amount that the direct injection injector injects when the internal combustion engine decelerates, wherein the injection amount is increased to above an injection amount of the direct injection injector that occurs during running of the internal combustion engine outside of deceleration, wherein the internal combustion engine comprises a purge valve for merging fuel vapor in a fuel tank with intake air, and the controller is further programmed to close the purge valve in a case where an injection amount required when the internal combustion engine decelerates is smaller than a minimum injection amount of the direct injection injector.

8. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:

a sensor that detects a running condition of the internal combustion engine; and a programmable controller programmed to:

cause the port injection injector and the direct injection injector to inject fuel on the basis of the running condition; and increase an injection amount that the direct injection injector injects when the internal combustion engine decelerates, wherein the injection amount is increased to above an injection amount of the direct injection injector that occurs during running of the internal combustion engine outside of deceleration, wherein the internal combustion engine comprises a variable compression ratio mechanism for varying a compression ratio, and the controller is further programmed to reduce the compression ratio via the variable compression ratio mechanism in a case where an injection amount required when the internal combustion engine decelerates is smaller than a minimum injection amount of the direct injection injector.

9. A fuel injection control device for an internal combustion engine having a port injection injector for injecting fuel into an intake port and a direct injection injector for injecting fuel into a combustion chamber under a fuel pressure that increases according to an increase in an engine load, the fuel injection control device comprising:

means for detecting a running condition of the internal combustion engine;

means for causing the port injection injector and the direct injection injector to inject fuel on the basis of the running condition; and means for increasing an injection amount that the direct injection injector injects when the internal combustion engine decelerates, wherein the injection amount is increased to above an injection amount of the direct injection injector that occurs during running of the internal combustion engine outside of deceleration.

10. A fuel injection control method for an internal combustion engine having a port injection injector for injecting fuel into an intake port and a direct injection injector for injecting fuel into a combustion chamber under a fuel pressure that increases according to an increase in an engine load, the fuel injection control method comprising:

detecting a running condition of the internal combustion engine;

causing the port injection injector and the direct injection injector to inject fuel on the basis of the running condition; and increasing an injection amount that the direct injection injector injects when the internal combustion engine decelerates, wherein the injection amount is increased to above an injection amount of the direct injection injector that occurs during running of the internal combustion engine outside of deceleration.

11. The fuel injection control method as defined in claim 10, wherein the method further comprises causing the port injection injector to decrease a fuel injection amount or stop fuel injection when increasing the injection amount that the direct injection injector injects.

* * * * *